(12) United States Patent
Gentleman et al.

(10) Patent No.: US 8,222,172 B2
(45) Date of Patent: *Jul. 17, 2012

(54) WETTING RESISTANT MATERIALS AND ARTICLES MADE THEREWITH

(75) Inventors: Molly Maureen Gentleman, College Station, TX (US); James Anthony Ruud, Delmar, NY (US); Margaret Louise Blohm, Schenectady, NY (US); Mohan Manoharan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,690

(22) Filed: May 31, 2011

(65) Prior Publication Data

US 2011/0226154 A1    Sep. 22, 2011

Related U.S. Application Data

(62) Division of application No. 12/340,785, filed on Dec. 22, 2008, now Pat. No. 7,977,267.

(60) Provisional application No. 61/122,756, filed on Dec. 16, 2008.

(51) Int. Cl.
*C04B 35/50* (2006.01)

(52) U.S. Cl. .......................... 501/152; 428/701; 428/702

(58) Field of Classification Search .................. 501/452, 501/152; 428/701, 702
See application file for complete search history.

(56) References Cited

U.S. PATENT DOCUMENTS

| | | | |
|---|---|---|---|
| 4,783,596 A * | 11/1988 | Riedner et al. | 250/483.1 |
| 5,100,598 A * | 3/1992 | Dole et al. | 264/1.22 |
| 5,116,559 A * | 5/1992 | Dole et al. | 264/1.22 |
| 5,882,547 A * | 3/1999 | Lynch et al. | 252/301.4 R |
| 6,093,347 A * | 7/2000 | Lynch et al. | 252/301.4 R |
| 6,730,422 B2 | 5/2004 | Litton et al. | |
| 6,821,656 B2 | 11/2004 | Dietrich et al. | |
| 6,852,433 B2 | 2/2005 | Maeda | |
| 7,329,370 B2 * | 2/2008 | Kim et al. | 252/301.4 R |
| 7,332,453 B2 | 2/2008 | Rosenflanz et al. | |
| 2007/0028588 A1 | 2/2007 | Varanasi et al. | |
| 2007/0031639 A1 | 2/2007 | Hsu et al. | |
| 2010/0151197 A1* | 6/2010 | Gentleman et al. | 428/142 |
| 2010/0151264 A1* | 6/2010 | Gentleman et al. | 428/469 |

FOREIGN PATENT DOCUMENTS

EP    1844863 A1    10/2007
(Continued)

OTHER PUBLICATIONS

Kitai et al., "Preparation and Characterization of High-k Praseodymium and Lanthanoid Oxide Thin Films Prepared by Pulsed Laser Deposition", The Japan Society of Applied Physics, Jpn. J. Appl. Phys., vol. 42, pp. 247-253, Part No. 1, Jan. 2003.

(Continued)

*Primary Examiner* — Karl Group
(74) *Attorney, Agent, or Firm* — Paul J. DiConza

(57) ABSTRACT

Ceramic materials with relatively high resistance to wetting by various liquids, such as water, are presented, along with articles made with these materials. The oxide materials described herein as a class typically contain europia ($Eu_2O_3$). The oxides may further contain other additives, such as oxides of gadolinium (Gd), samarium (Sm), dysprosium (Dy), or terbium (Tb). In certain embodiments the oxide, in addition to europia, further comprises ytterbia ($Yb_2O_3$), lanthanum (La), praseodymium (Pr), or neodymium (Nd).

3 Claims, 4 Drawing Sheets

FOREIGN PATENT DOCUMENTS

| | | | |
|---|---|---|---|
| JP | 7258632 | A | 10/1995 |
| JP | 2006348221 | A | 12/2006 |
| WO | 2005068399 | A1 | 7/2005 |
| WO | 2006135755 | A2 | 12/2006 |
| WO | 2007126432 | A1 | 11/2007 |

OTHER PUBLICATIONS

U.S. Appl. No. 11/487,023, filed Jul. 17, 2006, entitled Surfaces and Articles Resistant to Impacting Liquids.

* cited by examiner

WETTING RESISTANT MATERIALS AND ARTICLES MADE THEREWITH

This application is a divisional of application Ser. No. 12/340,785, now U.S. Pat. No. 7,977,267, filed 22 Dec. 2008, entitled "WETTING RESISTANT MATERIALS AND ARTICLES MADE THEREWITH", which claims priority to provisional Application Ser. No. 61/122,756, filed Dec. 16, 2008, is hereby incorporated by reference.

This invention was made with Government support under contract number 70NANB7H7009, awarded by National Institute of Standards and Technology. The Government has certain rights in the invention.

BACKGROUND

This invention relates to wetting resistant materials. More particularly, this invention relates to articles that include coatings of wetting resistant materials.

The "liquid wettability", or "wettability," of a solid surface is determined by observing the nature of the interaction occurring between the surface and a drop of a given liquid disposed on the surface. A high degree of wetting results in a relatively low solid-liquid contact angle and large areas of liquid-solid contact; this state is desirable in applications where a considerable amount of interaction between the two surfaces is beneficial, such as, for example, adhesive and coating applications. By way of example, so-called "hydrophilic" materials have relatively high wettability in the presence of water, resulting in a high degree of "sheeting" of the water over the solid surface. Conversely, for applications requiring low solid-liquid interaction, the wettability is generally kept as low as possible in order to promote the formation of liquid drops having high contact angle and thus minimal contact area with the solid surface. "Hydrophobic" materials have relatively low water wettability (contact angle generally at or above 90 degrees); so-called "superhydrophobic" materials (often described as having a contact angle greater than 120 degrees) have even lower water wettability, where the liquid forms nearly spherical drops that in many cases easily roll off of the surface at the slightest disturbance.

Heat transfer equipment, such as condensers, provide one example of an application where the maintenance of surface water as droplets rather than as a film is important. Two alternate mechanisms may govern a condensation process. In most cases, the condensing liquid ("condensate") forms a film covering the entire surface; this mechanism is known as filmwise condensation. The film provides a considerable resistance to heat transfer between the vapor and the surface, and this resistance increases as the film thickness increases. In other cases, the condensate forms as drops on the surface, which grow on the surface, coalesce with other drops, and are shed from the surface under the action of gravity or aerodynamic forces, leaving freshly exposed surface upon which new drops may form. This so-called "dropwise" condensation results in considerably higher heat transfer rates than filmwise condensation, but dropwise condensation is generally an unstable condition that often becomes replaced by filmwise condensation over time. Efforts to stabilize and promote dropwise condensation over filmwise condensation as a heat transfer mechanism in practical systems have often required the incorporation of additives to the condensing medium to reduce the tendency of the condensate to wet (i.e., form a film on) the surface, or the use of low-surface energy polymer films applied to the surface to reduce film formation. These approaches have drawbacks in that the use of additives may not be practical in many applications, and the use of polymer films may insert significant thermal resistance between the surface and the vapor. Polymer films may also suffer from low adhesion and durability in many aggressive industrial environments.

Texturing or roughening the surface can change the contact angle of water on a surface. A texture that increases the tortuosity of the surface but maintains the contact between water droplet and the surface will increase the contact angle of a hydrophobic material and decrease the contact angel of a hydrophilic material. In contrast, if a texture is imparted that maintains regions of air beneath a water droplet, the surface will become more hydrophobic. Even an intrinsically hydrophilic surface can exhibit hydrophobic behavior if the surface is textured to maintain a sufficiently high fraction of air beneath the water drop. However, for applications requiring highly hydrophobic or superhydrophobic behavior, it is generally more desirable in practice to texture a hydrophobic surface than to texture a hydrophilic surface. An intrinsically hydrophobic surface usually provides the potential for a higher effective contact angle after texturing than an intrinsically hydrophilic surface, and generally provides for a higher level of wetting resistance even if the surface texturing becomes less effective over time as the texture wears away.

Relatively little is known about the intrinsic hydrophobicity of broad classes of materials. In general, most of the materials known to have a contact angle with water of greater than 90 degrees are polymers such as tetrafluoroethylene, silanes, waxes, polyethylene, and propylene. Unfortunately, polymers have limitations in temperature and durability that can limit their application, because many practical surfaces that would benefit from low wettability properties are subject in service to high temperatures, erosion, or harsh chemicals.

Ceramic materials are typically superior to polymers in many aspects related to durability. Of the ceramic materials, oxide ceramics are particularly useful because they are highly manufacturable, often have high environmental resistance, and can have good mechanical properties. Unfortunately, there are virtually no known oxide ceramics that are hydrophobic. A notable exception is silicalite, a zeolitic polymorph of $SiO_2$ [E. M. Flanigen, J. M. Bennett, R. W. Grose, J. P. Cohen, R. L. Patton, R. M. Kirchner, and J. V. Smith, "Silicalite, a new hydrophobic crystalline silica molecular sieve," Nature, v. 271, 512 (1978)]. For that material the specific crystal structure is highly important because amorphous $SiO_2$ has a very low, hydrophilic wetting angle. However, the synthesis conditions required to form zeolite crystals can limit the range of applicability of those materials as hydrophobic surfaces and the porosity of zeolite crystals makes them less desirable for applications requiring durability.

Therefore, there remains a need in the art for oxide ceramics that have lower liquid wettability than conventional oxides, promote stable dropwise condensation, are stable at elevated temperatures, are amenable to coating processing, and have good mechanical properties. There is also a need for articles coated with these wetting resistant oxide ceramics.

BRIEF DESCRIPTION

Embodiments of the present invention are provided to meet these and other needs. One embodiment is an article comprising a coating disposed on a substrate, wherein the coating comprises an oxide. The oxide has up to about 25 atomic percent of its total cation content as tetravalent cations. The oxide has a composition defined by the chemical formula $(A_xB_{1-x})_2O_3$; where A comprises Yb or Eu, and B comprises Gd, Sm, Dy, or Tb; and x is in the range from about 0.01 to about 0.99. In this embodiment, the above is, however, subject to the following: (a) provided that, where A consists essentially of Yb, B consists essentially of Gd; and (b) provided that, where A consists essentially of Eu and B comprises Sm, Dy, or Tb, x is in the range from about 0.5 to about 0.99.

Another embodiment is an article comprising a coating disposed on a substrate, wherein the coating comprises an oxide, the oxide having a composition defined by the chemical formula $(Yb_xEu_{1-x})_2O_3$; wherein x is in the range from about 0.01 to about 0.99.

Another embodiment is an article comprising a surface situated to be routinely exposed to a liquid phase, wherein the surface comprises an $A_2O_3$-type oxide selected from the group consisting of ytterbium oxide and europium oxide.

Another embodiment is a material comprising an oxide comprising from about 60 mole % to about 95 mole % gadolinia and at least about 1 mole % ytterbia or europia, wherein the oxide is B-type monoclinic, and wherein the oxide has up to about 25 atomic percent of its total cation content as tetravalent cations.

Another embodiment is a material comprising: an oxide comprising at least about 50 mole % europia; and samaria, terbia, or dysprosia; wherein the material contains up to about 25 atom % of tetravalent cations relative to the total amount of cations present in the material.

Another embodiment is a material comprising: a B-type monoclinic oxide comprising ytterbia and europia; wherein the oxide contains up to about 25 atom % of tetravalent cations relative to the total amount of cations present in the material.

Another embodiment is an article comprising: a coating disposed on a substrate, the coating having a surface connected porosity content of up to about 5 percent by volume, wherein the coating comprises a material comprising at least about 20 atom % of a first oxide selected from the group consisting of ytterbia, europia, and combinations of these; and a second oxide selected from the group consisting of lanthana, praseodymia, and neodymia.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
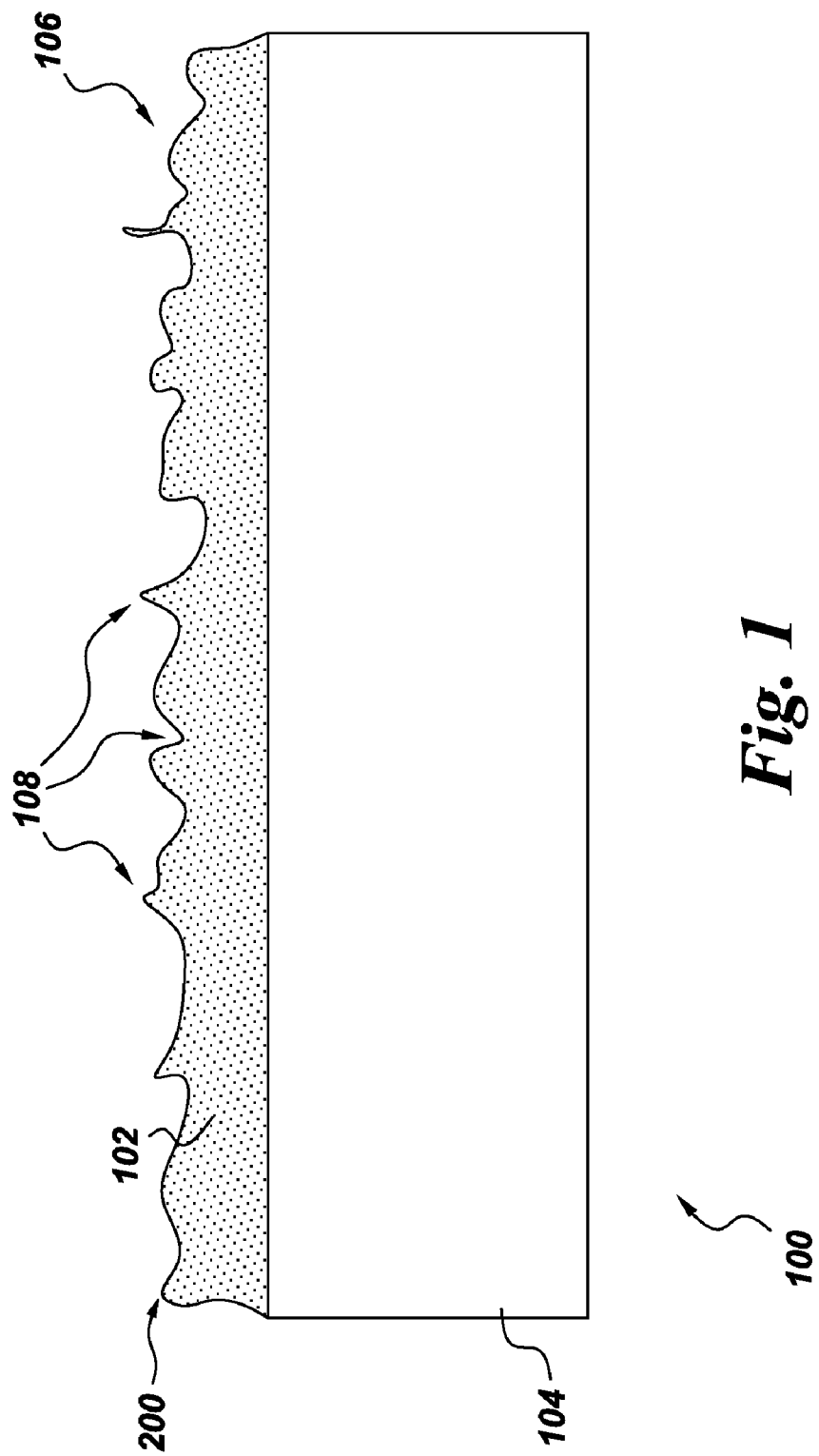
FIG. 1 is a schematic cross-section of an article in accordance with one embodiment of the present invention.

Embodiments of the present invention are based upon the discovery by the inventors of a class of oxide ceramics that shows certain surprising properties. First, they tend to have significantly lower water wettability than commonly known engineering oxides. Some compositions are intrinsically hydrophobic. Moreover, some compositions, even those not intrinsically hydrophobic, have demonstrated the ability to maintain stable dropwise water condensation, making them intriguing candidates for use in heat transfer applications, for instance. Without being bound by theory, it is suspected that this behavior is related to the nature of the oxygen-cation bonding occurring within the crystal structure of the oxide.

Finally, certain compositions are transparent to ultraviolet, visible, or infrared radiation, meaning they allow at least about 70% of the incident radiation to transmit through the material. Such compositions may allow for wetting-resistant windows and other useful applications, as will be discussed further herein.

Embodiments of the present invention include certain material compositions. Other embodiments include coatings and articles that include these compositions. These compositions may exist in any form, such as, for example, powders, coatings, and ingots. The materials described herein may be a mixture or a compound of multiple oxides. Throughout this description, the composition of the material may be described in terms of its component oxides, such as, for example, gadolinia and europia, even if these component oxides are technically not present in the material due to interactions such as phase transformations and chemical reactions. This notation is consistent with that commonly used in the art, where, for example, a compound such as ytterbium europium oxide may be interchangeably denoted as $Yb_2O_3 \cdot Eu_2O_3$, $YbO_{1.5} \cdot EuO_{1.5}$, or $YbEuO_3$.

It will be appreciated that where materials and articles are described herein as "comprising" or "including" one or more components, the scope of the description includes, without limitation, materials made only of the stated components; materials made of the stated components and including other components that do not materially affect the wettability of the material; and materials including the stated components but not excluding other components. Moreover, where lists of alternatives are provided, the alternatives are not meant to be exclusive; one or more of the alternatives may be selected, except where otherwise explicitly stated.

The oxide materials described herein as a class typically contain one or more of ytterbia ($Yb_2O_3$) and europia ($Eu_2O_3$). The oxides may further contain other additives, such as oxides of gadolinium (Gd), samarium (Sm), dysprosium (Dy), or terbium (Tb). In certain embodiments the oxide, in addition to the ytterbia and/or europia, further comprises lanthanum (La), praseodymium (Pr), or neodymium (Nd).

Both ytterbium (III) oxide and europium (III) oxide, which are $A_2O_3$-type oxides, have been found to promote dropwise condensation and to be intrinsically hydrophobic. Moreover, combinations (such as solid solutions) of these two oxides also were shown to have this same remarkable combination of properties. In one embodiment, mixed ytterbium-europium oxides are provided. The oxide has a formula of $(Yb_xEu_{1-x})_2O_3$; wherein x is in the range from about 0.01 to about 0.99. In a particular embodiment, a material comprises a B-type monoclinic oxide comprising ytterbia and europia, where up to about 25 atom percent of the total cations present in the oxide are tetravalent cations. As used herein, "B-type monoclinic" refers to the crystallographic structure known in the art as 2 C/m to refer to certain rare earth oxides. (*Handbook on the Physics and Chemistry of Rare Earths*, volume 3. Editors: K A Gschneidner and L Eyring, pp349ff. Elsevier Science Publishers, New York, N.Y. 1979.) The B-type monoclinic oxides described herein tend to show very desirable hydrophobicity and promotion of dropwise condensation. It was also found in some instances that having a high amount of tetravalent cations present in the material detracted from its wettability and condensation properties. In some embodiments, this B-type oxide further comprises an additional material such as Sm, Dy, or Tb, and in particular embodiments this additional material is up to about 50 mole percent of the oxide.

In one embodiment, the oxide of the present invention has a composition defined by the chemical formula $(A_xB_{1-x})_2O_3$.

Here A comprises Yb or Eu and B comprises Gd, Sm, Dy, or Tb, and x is in the range from about 0.01 to about 0.99. In particular embodiments, less than about 25 atomic percent of the total cations present in the oxide are tetravalent. Generally these materials have exhibited surprisingly desirable wettability and condensation properties, but certain compositions are typically less desirable because poor behavior is observed or expected. For instance, where A is essentially Yb (i.e., Eu content is very close to zero save for incidental impurity levels), only material having B consisting essentially of Gd is expected to show the desired properties; in some embodiments x is up to about 0.3. Similarly, where A is essentially Eu, levels of Sm, Dy, and/or Tb as denoted by x in the above formula in the range from about 0.5 to about 0.99 may result in desirable properties.

One example of a suitable material of the type presented herein, a material having attractive wetting and condensation-promoting properties, comprises an oxide comprising from about 60 mole percent to about 95 mole percent gadolinia and at least about 1 mole percent ytterbia or europia. In accordance with this embodiment, the oxide is B-type monoclinic, and less than about 25 atomic percent of the total cations present in the oxide are tetravalent. In some embodiments, the oxide comprises up to about 30 mole percent ytterbia, and in certain embodiments the oxide concurrently comprises at least about 70 mole percent gadolinia. In other embodiments, the oxide comprises up to about 25 mole percent europia, and may concurrently comprise at least about 75 mole percent gadolinia. These embodiments may include "binary" oxides, in which the oxide consists essentially of gadolinia and either ytterbia or europia but not both; in other embodiments, the oxide comprises both ytterbia and europia in addition to the gadolinia. In certain embodiments, the total amount of ytterbia plus europia present in the oxide is below about 40 mole percent, which provides an oxide that has shown particularly desirable wettability and condensation characteristics.

Certain compositions based on europia are suitable as well. In one embodiment, the material includes an oxide comprising at least about 50 mole percent europia and further comprising samaria, terbia, or dysprosia. Less than about 25 atomic percent of the total cations present in the oxide are tetravalent. In certain embodiments, the oxide is B-type monoclinic.

Certain combinations of cations in the above $(A_xB_{1-x})_2O_3$ material have shown or are expected to show particularly attractive wettability and condensation behavior. In one example, A comprises Eu, such as where A comprises Eu and B comprises Gd. In a particular embodiment A comprises Eu and B comprises Gd, and x is in the range from about 0.01 to about 0.4, a range which showed particularly good wettability behavior (the contact angle with water measured greater than 100 degrees for x equal to about 0.2, for instance). Another particular range of interest in this system is where x is in the range from about 0.7 to about 0.9, where contact angle of about 100 degrees was also observed. Where A comprises both Eu and Yb, B, in some embodiments, comprises Gd. In particular embodiments of this type, x is in the range from about 0.01 to about 0.3. Alternatively, x may be in the range from about 0.5 to about 0.99.

As mentioned above, in certain alternative embodiments the ytterbium and/or europium oxide material includes one or more of lanthanum (La), praseodymium (Pr), and neodymium (Nd). The present inventors have discovered that, remarkably, alloying oxides of ytterbium or europium with the hydrophobic but normally hygroscopic oxides of La, Pr, or Nd stabilizes these hygroscopic materials in the presence of water and produces oxides that promote stable dropwise condensation, even though these resultant materials tend to be hydrophilic.

The materials provided in accordance with these embodiments generally comprise at least about 20 mole percent of a first oxide that is ytterbia, europia, or a combination of these, and a second oxide that is an oxide of La, Pr, or Nd. In certain embodiments, the oxide material is defined by the chemical formula $((A)_xB_{1-x})_2O_3$, where A is Yb, Eu, or combinations thereof, and B is La, Pr, or Nd. In some embodiments, where B is La or Pr, x is in the range from greater than 0.5 to about 0.99. In other embodiments, where B is Nd, x is in the range from about 0.2 to about 0.99. Materials in these ranges may exhibit remarkable stability in the presence of water and promote dropwise condensation.

In another embodiment, a material includes a primary oxide comprising a primary oxide cation of cerium or hafnium. In some embodiments, the molar ratio of the primary oxide cations to total cations present in the material is within any of the corresponding ranges provided for the previously described material. The material further includes a secondary oxide that includes (i) a first secondary oxide cation comprising praseodymium or ytterbium, and (ii) a second secondary oxide cation that comprises a rare earth element, yttrium, or scandium. In certain embodiments, a molar ratio of first secondary oxide cations to total secondary oxide cations is in the range from about 0.01 to about 0.99; in certain embodiments this range is from about 0.05 to about 0.95; and in particular embodiments this range is from about 0.1 to about 0.90. In specific embodiments, the secondary oxide comprises praseodymium and lanthanum, and in some embodiments the secondary oxide comprises ytterbium and lanthanum.

Further embodiments of the present invention, as illustrated in FIG. 1, include an article 100 comprising a coating 102, where the coating 102 comprises any of the materials described herein. In some embodiments, this oxide material ("the material") makes up greater than about 50 percent of the coating volume. In certain embodiments, the material makes up greater than about 75 percent of the coating volume, and in some embodiments the material makes up substantially all of the coating volume (save for incidental impurities and void space). In some embodiments, this coating 102 has a low level of surface connected porosity, such as up to about 5 percent by volume. In certain embodiments, the surface connected porosity is even lower, such as lower than 2 percent, lower than 1 percent, lower than 0.5 percent, or lower than 0.1 percent (all percentages by volume). In some embodiments, the coating 102 is made of material that is substantially theoretically dense. A low content of surface connected porosity may inhibit the absorption of water into a pore network, thereby keeping liquid at the surface of the article. Even a surface made of highly hydrophobic material, for instance, may absorb water if the amount of open porosity is unduly high, thereby rendering the surface ineffective as a barrier to water.

In some embodiments, the article described above further comprises a substrate 104, such as a metal substrate, for example, upon which the aforementioned coating 102 is disposed. Examples of metal substrates include metals and alloys made with aluminum, steel, stainless steel, nickel, copper, or titanium. In particular, common engineering alloys such as 306 stainless steel, 316 stainless steel, 403 stainless steel, 422 stainless steel, Custom 450 stainless steel, commercially pure titanium, Ti-4V-6Al, and 70Cu-30Ni are suitable substrates.

Various intermediate coatings (not shown) may be applied for any reason, such as to achieve desired levels of adhesion between substrate and coating, depending on the nature of the materials involved and the selected methods for processing the materials. Such variations generally are within the knowledge of one skilled in the art. Thickness of the coating will depend upon the nature of the environment and the application envisioned for the article. For example, in a heat exchanger application, the coating is typically designed to minimize thermal resistance between the environment and the substrate while achieving a practical service lifetime. Determination of the coating thickness for a given application is within the knowledge of one skilled in the art.

In some embodiments the material, whether embodied in a coating or freestanding object, has a low level of overall porosity, such as lower than about 5 percent by volume. In certain embodiments, the overall porosity of the material is even lower, such as lower than about 1 percent. In some embodiments, the material is substantially theoretically dense throughout. The overall porosity of the material, like the thickness of the coating described above, plays a role in determining the thermal resistance of the article: higher porosity typically results in high thermal resistance. Thus, maintaining a low overall porosity may be important in embodiments where low thermal resistance is desirable.

Any manufacturing method useful for fabrication and/or deposition of ceramic oxide materials may be used for fabricating the materials and articles described herein. Accordingly, embodiments of the present invention include a method for protecting an article from a liquid-containing environment, comprising applying a coating 102 to a substrate 104, where the coating 102 comprises any of the materials described herein. Examples of well-known processes capable of making ceramic oxide materials include powder processing, sol-gel processing, chemical vapor deposition and physical vapor deposition. In powder processing methods, a ceramic article is formed from ceramic particles using a method such as pressing, tape casting, tape calendaring or screen printing, and then consolidating and densifying the powders using a sintering process. Sol-gel processing methods provide a ceramic precursor in liquid form to a substrate after which the ceramic material is substantially formed through chemical reactions such as hyrdrolyzation and polymerization, and subsequently heat treated to produce and densify the ceramic material. Chemical vapor deposition methods involve providing gaseous precursor molecules to a heated substrate to form a ceramic article and include atmospheric pressure chemical vapor deposition, low-pressure chemical vapor deposition, metal-organic chemical vapor deposition and plasma enhanced chemical vapor deposition. Physical vapor deposition processes produce a vapor of material from solid precursors and supply the vapor to a substrate to form a ceramic article. Physical vapor deposition processes include sputtering, evaporation, and laser deposition. In the case of bulk ceramic articles, the substrate is used to form the ceramic body in the form of a crucible, die or mandrel and subsequently removed. In the case of ceramic coatings, the ceramic article remains attached to the substrate. The processing methods can be selected and tailored by a practitioner skilled in the art to produce the desired control of chemical composition and density of the ceramic oxide articles.

In some embodiments, the surface of the material, e.g. a coating 102, further comprises a surface texture 106 to further improve the wetting-resistant properties of the article. A surface texture 106 comprises features 108 disposed at the surface; examples of such features include, without limitation, elevations (such as cylindrical posts, rectangular prisms, pyramidal prisms, dendrites, nanorods, nanotubes, particle fragments, abrasion marks, and the like); and depressions (such as holes, wells, and the like). In some embodiments, the surface texture serves to increase the tortuosity of the surface, which increases the contact angle of a hydrophobic material. In other embodiments, the features are sized and configured to create pockets of air between a drop of liquid and the surface, which can reduce the effective surface energy and produce a higher contact angle than would be expected for a smooth surface. Examples of such textures and methods for generating them are described in commonly owned U.S. patent application Ser. Nos. 11/497,096; 11/487,023; and 11/497,720; which are incorporated by reference herein in their entireties.

One particular exemplary embodiment of the present invention is a wetting-resistant article 100. Article 100 comprises a surface 200 situated to be routinely exposed to a liquid phase, meaning that the surface 200 is positioned in/on the article 100 such that, during normal operation or maintenance of the article 100, the surface 200 is likely to come into contact with a liquid phase such as water via any mechanism, including, as examples, condensation or impact. Examples of such articles include condensers, windows, steam turbine blades, or any component commonly exposed to moisture or humidity during operation or service. Surface 200 comprises any material described herein, such as an $A_2O_3$-type oxide selected from the group consisting of ytterbium oxide and europium oxide. As illustrated in FIG. 1, surface 200 may be disposed as part of a coating 102, but this is not necessarily the case; surface 200 may be part of a monolith of the material. In some embodiments, the oxide is present over at least about 50% of the area of surface 200; in particular embodiments this area fraction is even higher, such as greater than about 75%, and in further embodiments the surface consists essentially of the oxide.

Thermal barrier coatings made of rare-earth oxide-containing perovskites, such as lanthanum ytterbium oxide ($LaYbO_3$) are known in the art. See, for example, U.S. Pat. No. 6,821,656. Although the compositions used for these coatings are similar to some of those described above, the coatings described in the art have markedly different wetting resistance properties compared to the materials and articles described herein. Thermal barrier coatings are generally applied using thermal spray techniques or physical vapor techniques, both of which are known to produce coatings having relatively high levels of porosity. Typical industrial thermal bather coatings have porosity in the range from about 10 percent to about 25 percent. The porosity is generally thought to provide an advantage in these applications in that it may enhance the thermal resistance and strain compliance of the coating. For instance, it is well documented that the strain compliance necessary for thermal cycling of thermal barrier coatings requires significant amounts of porosity to be incorporated into the coatings, in the form of intercolumnar gaps in EB-PVD coatings and porosity between splats in thermal spray coatings. The distribution and morphology of coatings deposited by both processes has been studied extensively to understand the enhancement in thermal resistance in the coatings as well as the detrimental effects on thermal and mechanical properties caused by the sintering loss of the porosity. Such work has determined that sintering of the coating results in a decrease in porosity and increase in Young's modulus, thereby resulting in higher thermally induced stresses and a decrease in thermal fatigue lifetime of the thermal barrier coating. For these reasons, thermal barrier coatings generally are structured to maintain a high level of porosity over long lifetimes at elevated temperatures.

In stark contrast to thermal barrier coatings, however, the oxides applied in certain embodiments of the present invention are significantly denser, because their primary function is not to inhibit heat transfer to the substrate, but to inhibit buildup of liquids, ice, or other foreign matter at the coating surface. The high porosity levels described in the thermal barrier coating arts generally would not be suitable for use in many embodiments of the present invention. In fact, as noted above, in many heat transfer applications the material is designed to minimize thermal resistance, which typically would require achieving porosity levels that are as low as practically attainable.

Figure 2:
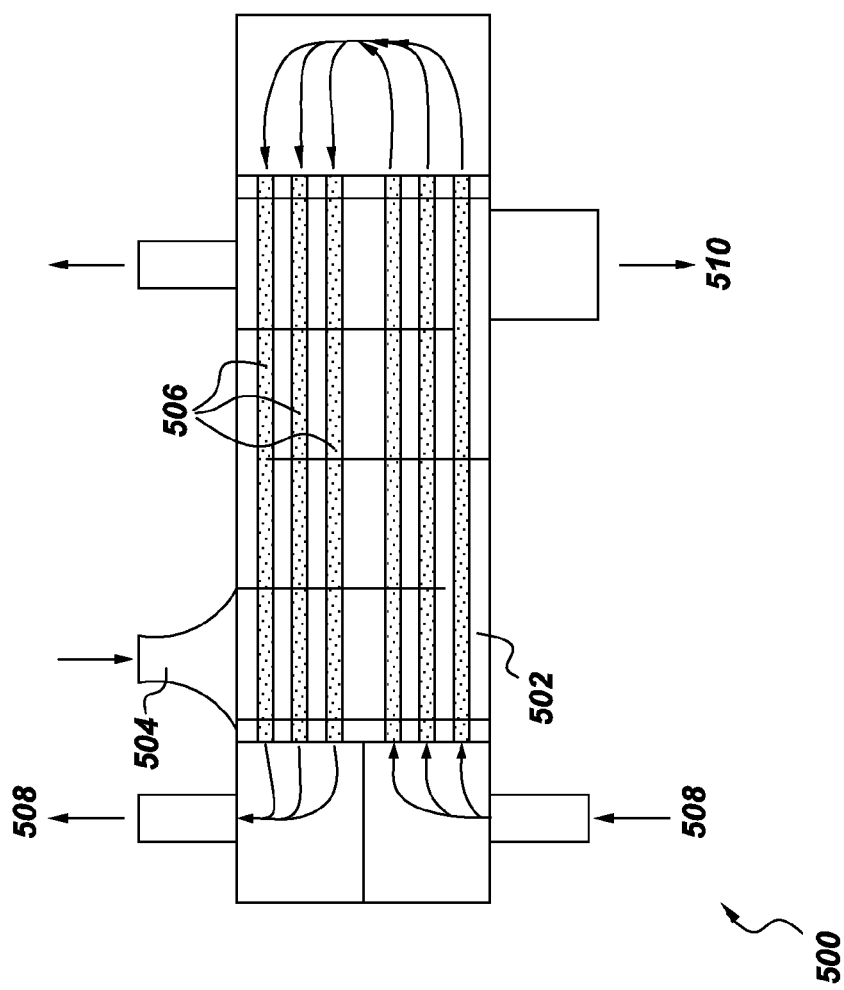
FIG. 2 is a schematic cross-section of an article in accordance with another embodiment of the present invention.

The novel properties described for the above embodiments lend themselves to a host of useful applications where resistance to wetting by liquids is desirable. A condenser used, for instance, to transfer heat between a hot vapor and a cooling fluid, such as is used in chemical processing, water desalination, and power generation, is an example of an embodiment of the present invention using the articles and materials described above. FIG. 2 illustrates one common type of condenser: the surface condenser 500. Steam, for example, enters shell 502 through inlet 504, whereupon it is condensed to water on the exterior surface of condensation tubes 506, through which flows a cooling fluid 508, such as water. The material (not shown) described above is disposed on this exterior surface of the condensation tubes 506, thereby promoting dropwise condensation of condensate water from the steam. The condensate is easily shed from the tubes 506 by the material and exits from shell 502 via condensate outlet 510.

In certain applications, such as, for example, steam turbines, metal components are subject to impinging drops of water as well as condensing drops. As steam expands in a turbine, water droplets (typically fog-sized) appear in the flow stream. These droplets agglomerate on the turbine blades and other components and shed off as larger drops that can cause thermodynamic, aerodynamic, and erosion losses in turbines. The ability to shed water droplets from components before they have a chance to agglomerate into substantially larger drops is thus important to maximize system lifetime and operation efficiency. As noted above, many of the compositions applied in embodiments of the present invention promote dropwise condensation, so that liquid is shed from the surface in small drops rather than in larger sheets. Accordingly, embodiments of the present invention include a steam turbine assembly comprising the article described above. In particular embodiments, the article is a component of a steam turbine assembly, such as a turbine blade, a turbine vane, or other component susceptible to impingement of water droplets during turbine operation.

Certain embodiments of the present invention may reduce the formation, adhesion, and/or accumulation of ice on surfaces. Icing takes place when a water droplet (sometimes supercooled) impinges upon the surface of an article, such as an aircraft component or a component of a turbine assembly (for example, a gas or wind turbine), and freezes on the surface. The build-up of ice on aircraft, turbine components, and other equipment exposed to the weather, increases safety risks and generates costs for periodic ice removal operations. Certain embodiments of the present invention include an aircraft that comprises the articles and materials described above; a component of such an aircraft suitable to serve as the embodied article may include, for example, a wing, tail, fuselage, or an aircraft engine component. Non-limiting examples of aircraft engine components that are suitable as articles in embodiments of the present invention include the nacelle inlet lip, splitter leading edge, booster inlet guide vanes, fan outlet guide vanes, sensors and/or their shields, and fan blades.

Icing is a significant problem for wind turbines, as the build-up of ice on various components such as anemometers and turbine blades reduces the efficiency and increases the safety risks of wind turbine operations. Wind turbine blades and other components are often made of lightweight composite materials such as fiberglass in order to save weight, and the build-up of ice can deleteriously load the blades to a point that significantly reduces their effectiveness. In certain embodiments of the present invention, an article as described above is a component, such as a turbine blade, anemometer, gearbox, or other component, of a wind turbine assembly.

As other components exposed to the weather are also adversely affected by ice and/or water accumulation, other embodiments may include, for instance, components of other items exposed to the weather, such as power lines and antennas. The ability to resist wetting may benefit a host of components that are so exposed, and the examples presented herein should not be read as limiting embodiments of the present invention to only those named applications.

One particularly useful potential application for some of the materials described herein include applications involving the transmission of electromagnetic radiation, especially infrared (IR), visible, and/or ultraviolet (UV) radiation. Those skilled in the art will appreciate that many of the oxides described herein are made of components, such as ytterbium oxide, for instance, that readily transmit radiation over significant portions of the visible and near visible (IR and UV) spectrum. Transparent oxides may be formed according to the methods described herein by controlling the composition and microstructure of the oxides. For example, where transparency is desired for a specified wavelength range, component oxides may be selected that do not substantially absorb in that range, and the material is then processed according to known methods to minimize defects that would scatter incident radiation. As an example, ytterbium oxide is transparent in the visible spectrum, and the present inventors have demonstrated pure ytterbium oxide coatings that are transparent to visible light and that are hydrophobic. Coatings comprising ytterbium gadolinium oxides are another example of hydrophobic materials that are also transparent over the visible spectrum up to about 900 nanometer wavelengths. The transparent material may be disposed as a coating 102 on a substrate 104, or may be a monolithic material. In particular embodiments of the articles described previously, coating 102, or surface 200, as appropriate, comprises a material that is transparent to electromagnetic radiation of at least one type selected from the group consisting of ultraviolet radiation, visible light, and infrared radiation. In particular embodiments, the substrate 104 comprises a material that is also transparent to the radiation. One example of a potentially useful application of the transparent material described above includes photovoltaic devices. Another example is a window of any type. Here "window" embraces any component designed to allow at least some incident visible or near visible radiation to transmit; examples include, but are not limited to, windows for buildings, windshields for vehicles, and components of sensors designed to sense or emit certain wavelengths of radiation. The hydrophobic and/or dropwise condensation-promoting properties of the transparent materials described herein allow the potential for windows and the like that easily shed dirt and water that may otherwise foul the surface and detract from performance.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

Example 1

A coating in accordance with embodiments described herein was deposited on an optically transparent quartz substrate by radio frequency magnetron sputtering. The sputtering target was obtained commercially having a composition of $Yb_2O_3$ (99.9% pure). A coating with a thickness of about 300 nm was produced using a deposition rate of about 100 Å/min at a forward power of 100 watts in a 7% oxygen/93% argon gas mixture. The contact angle with water for the coatings was about 93 degrees. The coating exhibited dropwise condensations in steam. The coating had a transparency of greater than 80% over the range of 250 to 2500 nm.

Example 2

Figure 3:
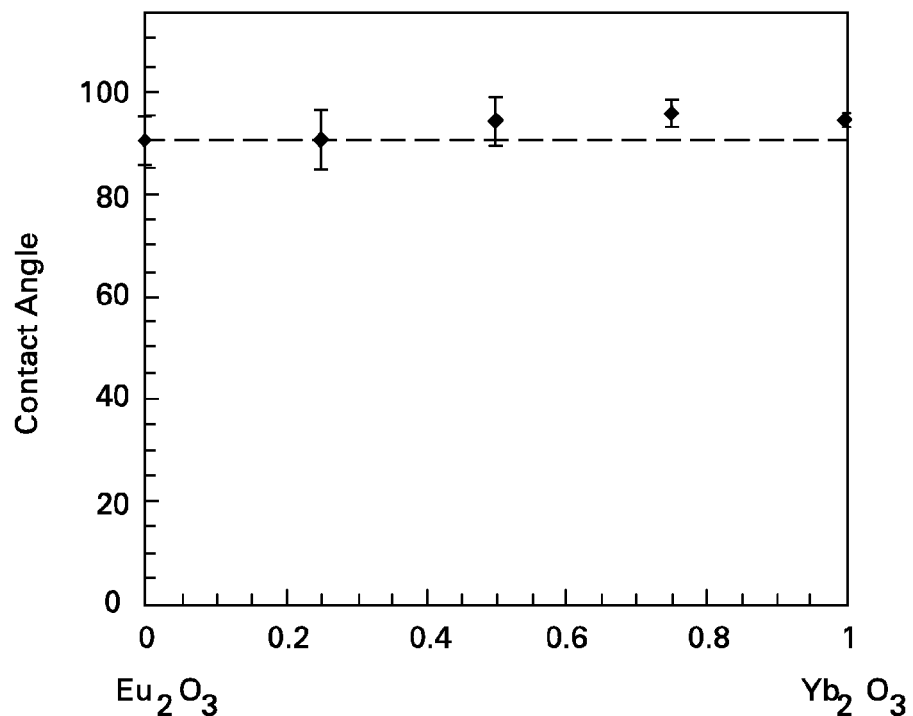
FIGS. 3-6 are data plots of water contact angle as a function of composition for various materials as described herein.
Figure 4:
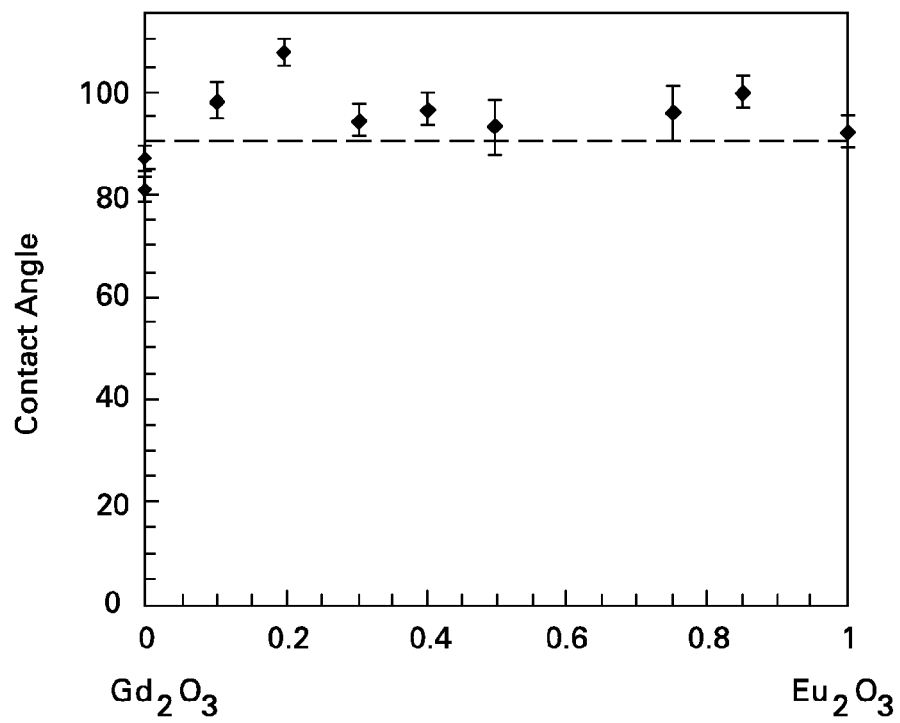
Figure 5:
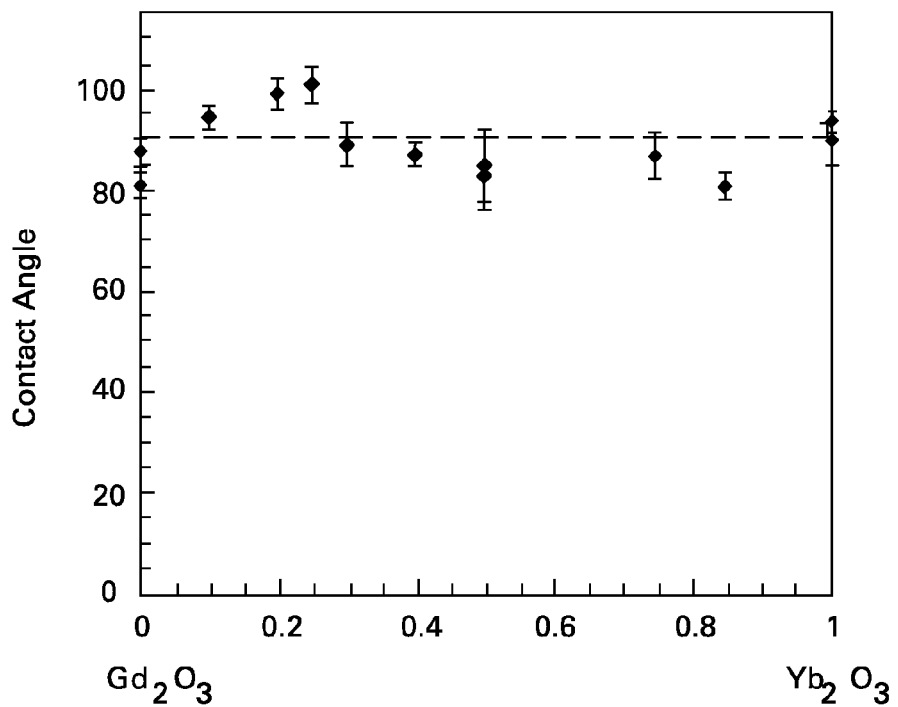
Figure 6:
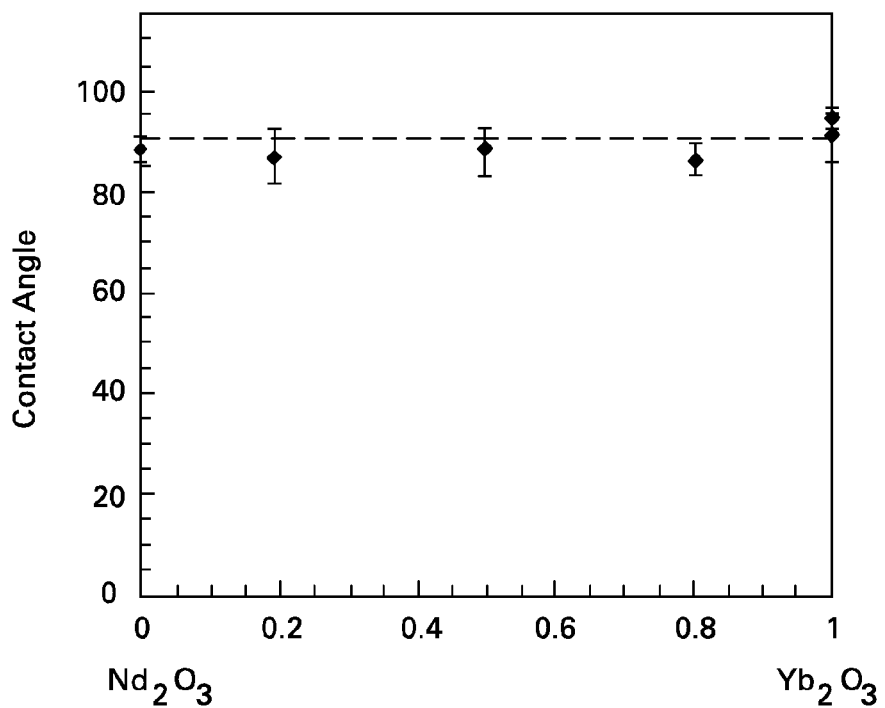

Sintered oxide disks were formed of various oxides in accordance with embodiments described herein by combining two component oxides in a predetermined molar ratio and sintering in air at 1600 degrees Celsius. Contact angle measurements with water were measured, and some of this data is presented in FIGS. 3 (Eu—Yb oxides), FIG. 4 (Eu—Gd oxides), FIG. 5 (Yb—Gd oxides), and FIG. 6 (Yb—Nd oxides). All of the compositions were tested in a condensation chamber at atmospheric pressure and their characteristics for promoting water condensation were evaluated. In each instance, the materials were found to promote drop-wise condensation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A material comprising:
    an oxide comprising
        at least about 50 mole % europia; and
        samaria, terbia, or dysprosia;
    wherein the material contains up to about 25 atom % of tetravalent cations relative to the total amount of cations present in the material.
2. The material of claim 1, wherein the oxide is B-type monoclinic.
3. The material of claim 1, wherein the material consists essentially of the oxide.

* * * * *

UNITED STATES PATENT AND TRADEMARK OFFICE
CERTIFICATE OF CORRECTION

| | | |
|---|---|---|
| PATENT NO. | : 8,222,172 B2 | Page 1 of 1 |
| APPLICATION NO. | : 13/118690 | |
| DATED | : July 17, 2012 | |
| INVENTOR(S) | : Gentleman et al. | |

It is certified that error appears in the above-identified patent and that said Letters Patent is hereby corrected as shown below:

In Column 1, Line 9, below "by reference.", insert -- STATEMENT REGARDING FEDERALLY SPONSORED RESEARCH & DEVELOPMENT --.

In Column 2, Line 40, delete "SiO2" and insert -- $SiO_2$ --, therefor.

In Column 2, Line 44, delete "SiO2" and insert -- $SiO_2$ --, therefor.

In Column 7, Line 43, delete "Hyrdrolyzation" and insert -- Hydrolyzation --, therefor.

In Column 8, Line 47, delete "bather" and insert -- barrier --, therefor.

In Column 12, Line 2, delete "FIGS." and insert -- FIG. --, therefor.

Signed and Sealed this
Eighteenth Day of September, 2012

David J. Kappos
*Director of the United States Patent and Trademark Office*